United States Patent
Banijamali et al.

(10) Patent No.: US 12,260,300 B2
(45) Date of Patent: Mar. 25, 2025

(54) METHODS AND SYSTEMS FOR OBSERVATION PREDICTION IN AUTONOMOUS VEHICLES

(71) Applicants: Seyed Ershad Banijamali, Toronto (CA); Mohsen Rohani, Gatineau (CA)

(72) Inventors: Seyed Ershad Banijamali, Toronto (CA); Mohsen Rohani, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1226 days.

(21) Appl. No.: 17/022,771

(22) Filed: Sep. 16, 2020

(65) Prior Publication Data

US 2021/0081843 A1 Mar. 18, 2021

Related U.S. Application Data

(60) Provisional application No. 62/901,642, filed on Sep. 17, 2019.

(51) Int. Cl.
*G06N 20/00* (2019.01)
*G06N 5/02* (2023.01)

(52) U.S. Cl.
CPC .............. *G06N 20/00* (2019.01); *G06N 5/02* (2013.01)

(58) Field of Classification Search
CPC .................................. G06N 20/00; G06N 5/02
See application file for complete search history.

(56) References Cited

U.S. PATENT DOCUMENTS

| | | | | |
|---|---|---|---|---|
| 2020/0110416 A1* | 4/2020 | Hong | ................... | G05D 1/0221 |
| 2020/0326719 A1* | 10/2020 | Tram | ..................... | G06N 20/00 |
| 2021/0001897 A1* | 1/2021 | Chai | ...................... | G06N 3/045 |

FOREIGN PATENT DOCUMENTS

| | | |
|---|---|---|
| CN | 107229973 A | 10/2017 |
| CN | 108205922 A | 6/2018 |
| CN | 109017799 A | 12/2018 |
| CN | 109927719 A | 6/2019 |
| CN | 109969172 A | 7/2019 |
| CN | 110209177 A | 9/2019 |

(Continued)

OTHER PUBLICATIONS

Bhattacharyya, Apratim, et al. "Conditional flow variational autoencoders for structured sequence prediction." arXiv preprint arXiv:1908.09008 (2019). (Year: 2019).*

(Continued)

*Primary Examiner* — Kevin W Figueroa (57) ABSTRACT

Methods and systems for observation prediction in autonomous vehicles are described. A set of observations is received, including a current observation and one or more previous observations. Each observation includes a respective view of the environment and a vehicle state at each time step. A current action is received. A current-action embedded view is produced, the current-action embedded view representing an estimated change in vehicle state caused by the current action in a current view. A predicted view is generated from the current-action embedded view and the set of observations. The predicted view is re-centered. A predicted observation is fed back, including the re-centered predicted view and estimated change in vehicle state, to be included in the set of observations as input for multi-step training of the action-based prediction subsystem.

18 Claims, 8 Drawing Sheets

(56) References Cited

FOREIGN PATENT DOCUMENTS

JP           2001134320 A     5/2001
WO       2019095013 A1    5/2019

OTHER PUBLICATIONS

M. Bansal, A. Krizhevsky, and A. Ogale. Chauffeurnet: Learning to drive by imitating the best and synthesizing the worst. arXiv preprint arXiv:1812.03079 2019.

M. Henaff, A. Canziani, and Y. LeCun. Model-predictive policy learning with uncertainty regularization for driving in ense traffic. arXiv preprint arXiv: 1901.02705 2019.

D.P. Kingma and M. Welling. Auto-encoding variational bayes. In ICLR 2014.

N. Mohajerin and M. Rohani. Multi-step prediction of occupancy grid maps with recurrent neural networks. In Proceedings of the IEEE Conference on Computer Vision and Pattern Recognition 2019.

K. Sohn, H. Lee, and X. Yan. Learning structured output representation using deep conditional generative models. In Advances in neural information processing systems 2015.

\* cited by examiner

METHODS AND SYSTEMS FOR OBSERVATION PREDICTION IN AUTONOMOUS VEHICLES

CROSS-REFERENCE TO RELATED APPLICATIONS

The present disclosure claims priority from U.S. provisional patent application No. 62/901,642, entitled "AN OBSERVATION PREDICTION AND PLANNING METHOD AND SYSTEM FOR HANDLING EXTREME ACTIONS IN AUTONOMOUS VEHICLES", filed Sep. 17, 2019, the entirety of which is hereby incorporated by reference.

FIELD

The present disclosure relates to methods and systems for observation prediction in autonomous vehicles, including methods and systems for observation prediction for rare or extreme actions of the ego-vehicle.

BACKGROUND

Action-based prediction models can predict future observations of an environment in which an autonomous vehicle operates after the autonomous vehicle applies actions to interact with the environment. A learned action-based prediction model can generate predictions about the observed environment, which in turn can be used by a reinforcement learning algorithm to generate an action to be executed based on some learned policy. Future observations can be predicted by an action-based prediction model after applying some new actions to the action-based prediction model.

The ability to accurately predicting future observations can be important in some applications, such as autonomous vehicles. For example, in autonomous vehicles, there is usually a limited number of training data samples available in which the autonomous vehicle is in an extreme scenario (e.g., accident or near-accident scenario). Being able to accurately predict future observations in extreme scenarios is important, because the autonomous vehicle may need to take extreme actions to avoid an accident. However, collecting real-world data for such extreme scenarios is difficult. Extreme scenarios, in which a vehicle takes extreme actions, are by definition rare. In the context of driving a vehicle, it may be dangerous or impossible to intentionally generate such real-world data.

In most conventional action-based prediction models, an action is directly fed to the model in order to generate an observation prediction. When there is insufficient training data for certain rare states, the prediction error is high. Therefore, it would be difficult for a conventional action-based prediction model to accurately predict the effect of some rare actions on future observations. A state-of-the-art prediction model in the area of autonomous vehicles is called model-predictive policy with uncertainty regularization (MPUR). MPUR has been shown to be successful at predicting the effect of action within a distribution of the actions in the training data samples. However, in the case of extreme actions, MPUR fails to predict a valid observation. Another method for resolving the issue of predicting observations for extreme actions has been described in M. Bansal, A. Krizhevsky, and A. Ogale, "Chauffeurnet: Learning to drive by imitating the best and synthesizing the worst," arXiv:1812.03079 [cs.RO], 2018. In this paper, training data samples are augmented by adding some synthetic extreme actions and their corresponding observation. However, the algorithm described by Bansal et al. is limited to predicting an outcome of applying actions that are seen in the augmented data samples. Moreover, applying some random new actions can result in invalid observations that do not happen in real life.

Accordingly, it would be desirable to provide methods and systems that can be trained to generate more accurate observation predictions, even for actions that are rare in real-world data.

SUMMARY

In various examples, the present disclosure describes an approach to observation prediction, in which first order action effects (i.e., effect of ego-action on the ego-vehicle) are estimated based on prior knowledge about the dynamics of the problem. A prediction model thus may only need to learn prediction of second order action effects (i.e., effect of ego-action on other moving objects in the environment). In this way, the learned prediction model may be trained to account for rare or extreme ego-actions, and may be less sensitive to the distribution of actions in the training data.

In some example aspects, the present disclosure describes a method of training an action-based prediction subsystem for an autonomous vehicle. The method includes: receiving a set of observations, the set of observations including a current observation for a current time step and one or more previous observations, each observation for a given time step comprising a respective view of an environment of the autonomous vehicle and a vehicle state at the given time step; receiving a current action performed by the autonomous vehicle at the current time step; producing a current-action embedded view, the current-action embedded view representing an estimated change in vehicle state caused by the current action in a current view; generating from the current-action embedded view and the set of observations, a predicted view for a future time step; re-centering the predicted view; and feeding back a predicted observation, including the re-centered predicted view and estimated change in vehicle state, to be included in the set of observations as input for multi-step training the action-based prediction subsystem.

In any of the examples, generating the predicted view may include: encoding a current vehicle state into a first multi-dimensional vector; encoding the views of the environment and the current-action embedded view into a second multi-dimensional vector; sampling a probabilistic distribution estimated by a probabilistic image encoder to obtain a third multidimensional vector, the probabilistic distribution representing a conditional probability of a predicted view, given the set of observations and the current-action embedded view; and decoding a combined vector, the combined vector being produced by combining the first, second and third multidimensional vectors, to generate the predicted view.

In any of the examples, the method may include: computing a loss according to a loss function; and backpropagating the loss to update parameters of the action-based prediction subsystem.

In any of the examples, the vehicle state at each given time step may include a vehicle position and a vehicle velocity.

In any of the examples, the estimated change in vehicle state caused by the current action may be computed using defined rules based on known dynamics of the autonomous vehicle.

In any of the examples, the trained action-based prediction subsystem may be used to generate predicted observations for an action generator system.

In some example aspects, the present disclosure describes a computing system including a processor system coupled to a memory. The memory stores instructions that, when executed by the processor system, cause the computing system to perform any of the methods described above.

In some examples aspects, the present disclosure describes a computer-readable medium having instructions encoded thereon. The instructions, when executed by a processor system of a computing system, cause the computing system to perform any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Some examples of the present disclosure are described in the context of autonomous vehicles. Although examples described herein may refer to a car as the autonomous vehicle, the teachings of the present disclosure may be implemented in other forms of autonomous or semi-autonomous vehicles including, for example, trams, subways, trucks, buses, surface and submersible watercraft and ships, aircraft, drones (also called unmanned aerial vehicles (UAVs)), warehouse equipment, manufacturing facility equipment, construction equipment, farm equipment, autonomous service robots such as vacuum cleaners and lawn mowers, and other robotic devices. Autonomous vehicles may include vehicles that do not carry passengers as well as vehicles that do carry passengers.

Figure 1:
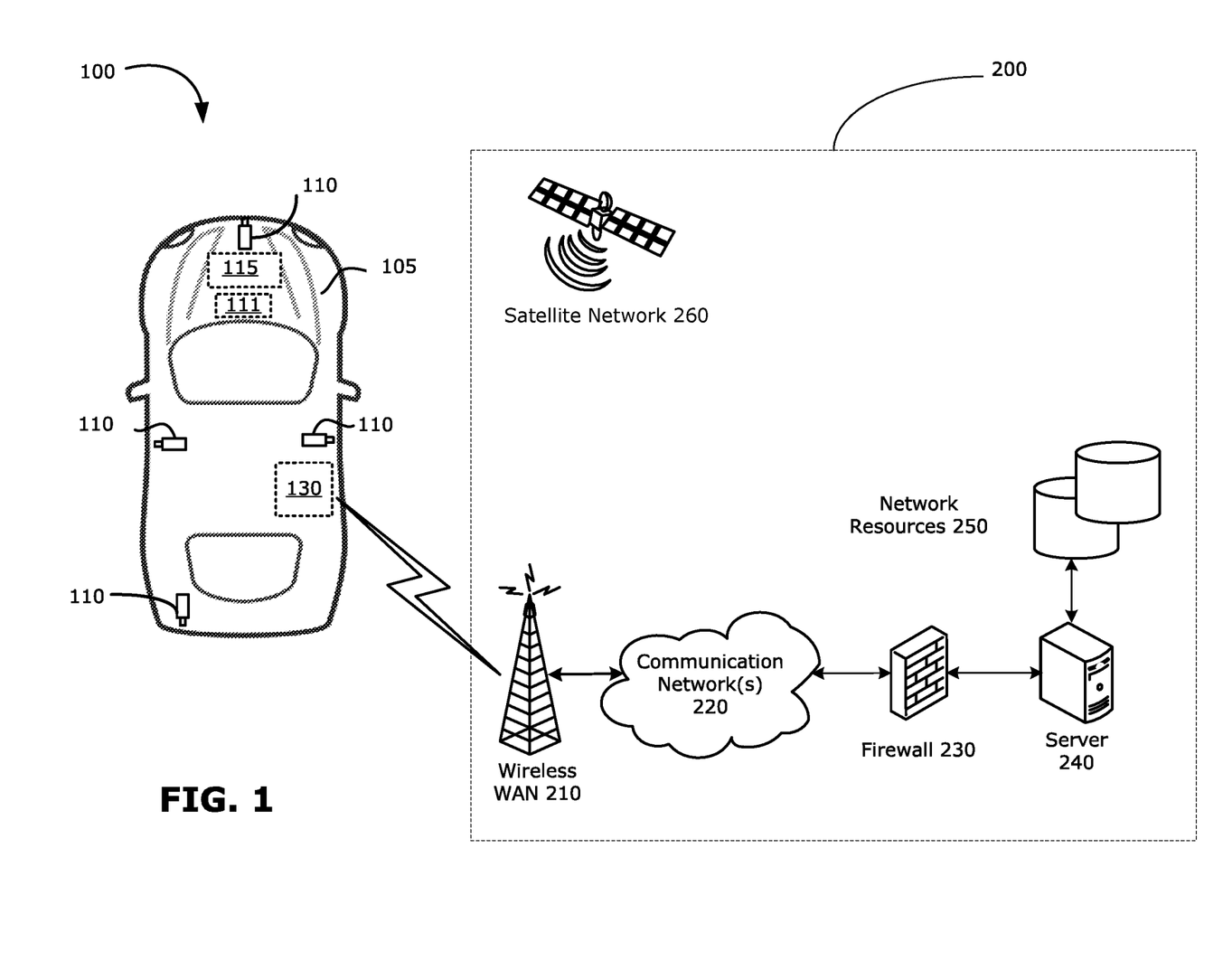
FIG. 1 is a schematic diagram showing an example environment in which an autonomous vehicle operates.

FIG. 1 is a schematic diagram showing an example environment 100 in which a vehicle 105 operates. Examples of the present disclosure may be implemented in the vehicle 105, for example to enable autonomous or semi-autonomous driving. The environment 100 includes a communication system 200 that communicates with the vehicle 105. The vehicle 105 includes a vehicle control system 115. The vehicle control system 115, is coupled to a drive control system and a mechanical system of the vehicle 105, as described further below with reference to FIG. 2. The vehicle control system 115 can, in various examples, enable the vehicle 105 to be operable in one or more of a fully-autonomous, semi-autonomous or fully user-controlled mode.

The vehicle 105 may include sensors, shown here as a plurality of environment sensors 110 that collect information about the external environment 100 surrounding the vehicle 105 and generate sensor data indicative of such information, and a plurality of vehicle sensors 111 that collect information about the operating conditions of the vehicle 105 and generate vehicle data indicative of such information. There may be different types of environment sensors 110 to collect different types of information about the environment 100, as discussed further below. In an example embodiment, the environment sensors 110 are mounted to and located at the front, rear, left side and right side of the vehicle 105 to collect information about the external environment 100 located in front, rear, left side and right side of the vehicle 105. For individual units of the environment sensors 110, may be mounted or otherwise located on the vehicle 105 to have different overlapping or non-overlapping fields of view (FOVs) or coverage areas to capture data about the environment 100 surrounding the vehicle 105. The vehicle control system 115 receives sensor data indicative of collected information about the external environment 100 of the vehicle 105 as collected by the environment sensors 110.

The vehicle sensors 111 provide vehicle data indicative of collected information about the operating conditions of the vehicle 105 to the vehicle control system 115 in real-time or near real-time. For example, the vehicle control system 115 may determine a linear speed of the vehicle 105, angular speed of the vehicle 105, acceleration of the vehicle 105, engine RPMs of the vehicle 105, transmission gear and tire grip of the vehicle 105, among other factors, using vehicle data indicative of information about the operating conditions of the vehicle 105 provided by one or more of the vehicle sensors 111.

The vehicle control system 115 may include or be coupled to one or more wireless transceivers 130 that enable the vehicle control system 115 to communicate with the communication system 200. For example, the wireless transceiver(s) 130 may include one or more cellular (RF) transceivers for communicating with a plurality of different radio access networks (e.g., cellular networks) using different wireless data communication protocols and standards. The wireless transceiver(s) 130 may communicate with any one of a plurality of fixed transceiver base stations of a wireless wide area network (WAN) 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 may be connected to network resources 250, such as supplemental data sources that may provide information to be used by the vehicle control system 115.

The wireless transceiver(s) 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol. The wireless transceiver(s) 130 may also comprise a short-range wireless transceiver, such as a Bluetooth® transceiver, for communicating with a mobile computing device, such as a smartphone or tablet. The wireless transceiver(s) 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The communication system 100 also includes a satellite network 260 comprising a plurality of satellites. The vehicle control system 115 may use signals from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Figure 2:
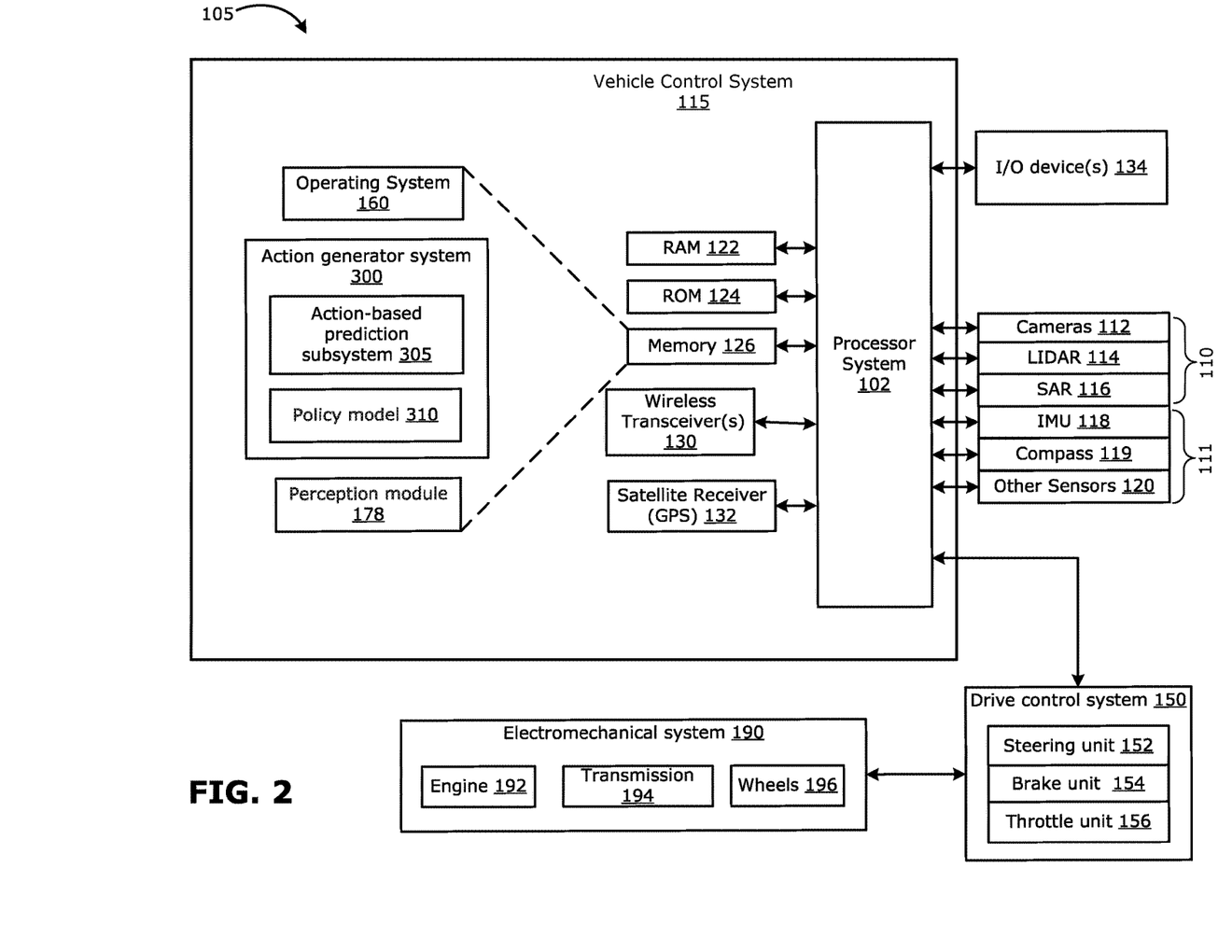
FIG. 2 is a block diagram illustrating some example components of an autonomous vehicle.

FIG. 2 illustrates selected components of the vehicle 105 in accordance with some examples described herein. The vehicle 105 includes a vehicle control system 115 that is coupled to a drive control system 150 and an electromechanical system 190. The vehicle control system 115 is also coupled to receive data from the environment sensors 110 and the vehicle sensors 111.

The environment sensors 110 may, for example, include one or more camera units 112, one or more light detection and ranging (LIDAR) units 114, and one or more radar units such as synthetic aperture radar (SAR) units 116, among other possibilities. Each type of sensor unit 112, 114, 116, may collect respective different information about the environment 100 external to the vehicle 105, and may provide sensor data to the vehicle control system 115 in respectively different formats. For example, a camera unit 112 may provide camera data representative of a digital image, a LIDAR unit 114 may provide a two or three-dimensional point cloud, and the SAR unit may provide radar data representative of a radar image.

The vehicle sensors 111 may include, for example, an inertial measurement unit (IMU) 118 that senses the vehicle's 105 specific force and angular rate and that provides data about an orientation of the vehicle based on the sensed specific force and angular rate. The vehicle sensors 111 may also include an electronic compass 119, and other vehicle sensors 120 such as a speedometer, a tachometer, wheel traction sensor, transmission gear sensor, throttle and brake position sensors, and steering angle sensor.

The vehicle control system 115 may also collect information about a position of the vehicle 105 using signals received from the satellite network 260, via a satellite receiver 132 and generate positioning data representative of the position of the vehicle 105.

The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor system 102. The processor system 102 is coupled to the drive control system 150, a Random Access Memory (RAM) 122, a Read Only Memory (ROM) 124, a persistent (non-volatile) memory 126 such as flash erasable programmable read only memory (EPROM) (flash memory), the wireless transceiver(s) 130, the satellite receiver 132, and one or more input/output (I/O) devices 134 (e.g., touchscreen, speaker, microphone, display screen, mechanical buttons, etc.). The processor system 102 may include one or more processing units, including for example one or more central processing units (CPUs), one or more graphical processing units (GPUs), one or more tensor processing units (TPUs), and other processing units.

The drive control system 150 provides control signals to the electromechanical system 190 to effect physical control of the vehicle 105. When in fully or semi-autonomous driving mode, for example, the drive control system 150 receives a planned action (as discussed further below) from the vehicle control system 115 and translates the planned action into control signals using a steering unit 152, a brake unit 154 and a throttle (or acceleration) unit 156. Each unit 152, 154, 156 may be implemented as software module(s) or control block(s) within the drive control system 150. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

The memory 126 of the vehicle control system 115 has stored thereon software instructions that are executable by the processor system 102. The software instructions may be executed by the processor system 102 to implement one or more software systems, software subsystems, and software modules. Generally, it should be understood that software systems, software subsystems, and software modules disclosed herein may be implemented as a set of instructions stored in the memory 126. For example, the memory 126 may include executable instructions for implementing an operating system 160 and an action generator system 300. The action generator system 300 may be a machine-learning model that generates an action to be executed by the vehicle 105, based on a learned driving policy. In examples disclosed herein and described further below, the action generator model 300 includes a learned action-based prediction subsystem 305 and a policy model 310.

Sensor data received from the environment sensors 110 and vehicle data received from the vehicle control sensors 111 (and optionally also positioning data collected from the satellite network 260) may be used by a perception module 178 to generate observations about the environment 100. The perception module 178 may be a machine-learning based module (e.g., a neural network) that has been trained to generate an observation for each time step, as discussed below.

The perception module 178 uses collected sensor data and vehicle data to generate an observation $O_t$ for a time step t. As will be discussed further below, the observation $O_t$ includes information about the external environment 100 as well as information about the state of the vehicle 105 (e.g., a position and velocity of the vehicle 105). The perception module 178 may include any number of independent or interconnected modules or functions, and may, for example, include rules-based modules, machine learning based modules, and combinations thereof. Machine learning based modules may be implemented using neural networks, such any type of deep neural networks (DNN), such as convolution neural networks (CNNs) or recurrent neural networks (RNNs), long-short term memory networks, etc. In some examples, the state encoder 178 can include a fusion module for fusing sensor data and vehicle data from multiple environment sensors 110 and vehicle sensors 111 to generate fused data; a classification module configured for processing the sensor data or the fused data to detect and identify objects in the environment 100 (e.g., to detect and identify a stationary obstacle, or a pedestrian or another vehicle, lanes and lane boundaries, and traffic lights/signs, among other things); and a localization and mapping module for constructing or updating a map of the environment 100 and estimating a position of the vehicle 100 within the map.

The memory 126 may also have stored thereon instructions for implementing other software systems, subsystems, and modules, for example a navigation module, a climate control module, a media player module, a telephone module and/or a messaging module.

The action-based prediction subsystem 305 will now be described. In disclosed examples, observations about the external environment 100 may include a bird's-eye view of the environment 100, in which the vehicle 105 is in the center of the view. The view of the environment 100, denoted as $I_t$, may be represented in the form of an image, or an occupancy grid map (OGM), for example. An observation (denoted by $O_t$) also includes information about the state of the vehicle 105 (i.e. vehicle state), such as a position of the vehicle 105 (denoted by $p_t$), and a velocity of the vehicle 105 (denoted by $v_t$). In other words, an observation $O_t=(I_t, p_t, v_t)$, where t denotes a current time step. In some examples, the position pt of the vehicle 105 may be in global position system (GPS) coordinates.

For clarity, the vehicle 105 in which the action-based prediction subsystem 305 is implemented may be referred to as the ego-vehicle, to distinguish from other vehicles in the environment 100. The action effected by the ego-vehicle (denoted as $a_t$, and referred to in some examples as the ego-action) causes a change in the state of the ego-vehicle 105 itself (referred to as first order action effects), as well as a change in the environment 100 (referred to as second order action effects). Second order action effects may include reactions of other vehicles in response to the ego-action of the ego-vehicle 105.

Instead training a predictor to predict both second order action effects and first order action effects, the disclosed action-based prediction subsystem 305 implements a predictor that combines prior knowledge (e.g., known dynamics of how the ego-vehicle 105 reacts to ego-actions) with observations, and uses machine learning to learn a predictor that generates predicted observations with a focus on second order action effects.

Figure 3:
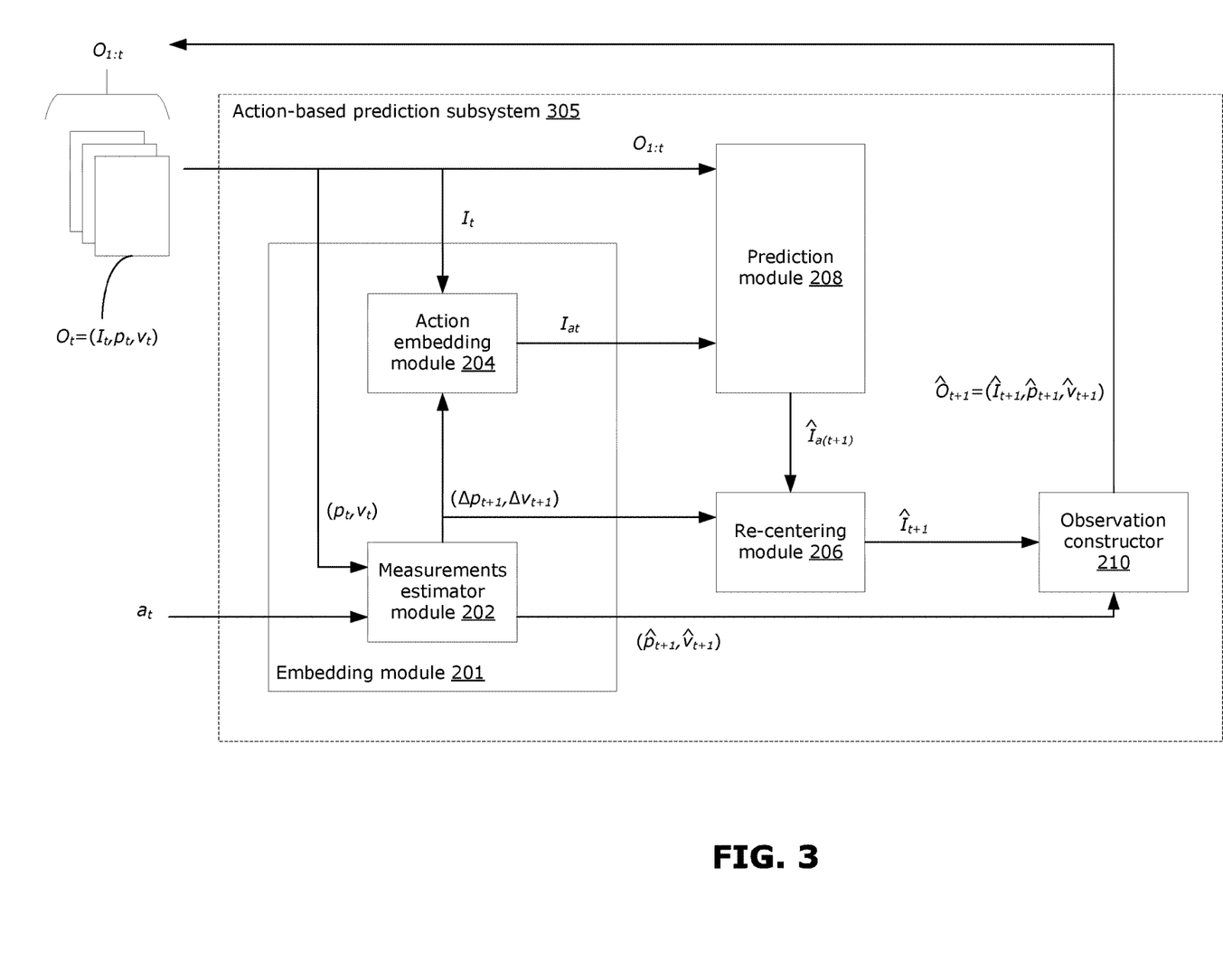
FIG. 3 is a block diagram illustrating an example implementation of an action-based prediction subsystem, which may be implemented in an autonomous vehicle.

FIG. 3 is a block diagram illustrating an example implementation of the action-based prediction subsystem 305. The action-based prediction subsystem 305 includes three rules-based modules, namely a measurements estimator module 202, an action embedding module 204 and a re-centering module 206. The action-based prediction subsystem 305 also includes a machine learning-based module, namely a prediction module 208. In the example shown, the action-based prediction subsystem 305 also includes an observation constructor 210.

The action-based prediction subsystem 305 receives as input a set of observations about the environment 100 and the vehicle 105 (denoted as $O_{1:t}$) including a current observation $\hat{O}_t$ at time step t and previous observations. Also received as input is the current action at that is executed by the vehicle 105 at time step t. From this input, the action-based prediction subsystem 305 generates a predicted future observation $\hat{O}_{t+1}$ for a future time step t+1. The current action at and the current observation $O_t$ are received by an embedding module 201, which includes the measurements estimator module 202 and the action embedding module 204. Although specific modules 202, 204 are described and shown in FIG. 3, in some examples there may not be separate modules 202, 204 in the embedding module 201.

The measurements estimator module 202 receives the current action at of the vehicle 105, and the current state of the vehicle 105 extracted from the current observation $O_t$. In this example, the current state of the vehicle 105 includes the current position and current velocity of the vehicle 105 ($p_t$, $v_t$) among other state parameters. In other examples, other state parameters (e.g., linear or angular acceleration) may additionally or alternatively be included in the current state of the vehicle. The measurements estimator module 202 then computes (e.g., using defined rules based on the known dynamics of the vehicle 105) an estimated change in the state of the vehicle 105 (denoted as ($\Delta p_{t+1}, \Delta v_{t+1}$)) at the next time step t+1. For example, if the current action at of the vehicle 105 is a given acceleration of the vehicle 105, the measurements estimator module 202 may compute the estimated change in position and velocity of the vehicle 105 using, as the defined rules, known kinematic formulas.

The action embedding module 204 receives the current OGM representing the current view $I_t$ of the environment 100 extracted from the current observation $O_t$. In examples described herein, the current view $I_t$ of the environment is a bird's-eye view of the environment 100, which may be represented by an OGM or other 2D image. For simplicity, a representation (e.g., OGM) of a view of the environment 100 may be referred to simply as the view. However, it should be understood that the view $I_t$ of the environment 100 may be represented in other formats, for example as an image. The action embedding module 204 also receives the estimated state change ($\Delta p_{t+1}, \Delta v_{t+1}$) from the measurements estimator module 202. The action embedding module 204 deterministically updates the view of the environment 100 to produce a current-action embedded view, denoted as $I_{at}$, that reflects the estimated change in the state of the ego-vehicle 105 ($\Delta p_{t+1}, \Delta v_{t+1}$). Notably, the current-action embedded view $I_{at}$ reflects the first order action effects of the current action $a_t$, but not the second order action effects. In other words, the current-action embedded view $I_{at}$ reflects the estimated future state of the ego-vehicle 105 at the next time step t+1, as a result of the current action $a_t$, but all other vehicles are unchanged from the observed environment at time step t. It should also be noted that the current-action embedded view $I_{at}$ is mostly unchanged from the current view $I_t$, except for the estimated future state of the ego-vehicle 105 (i.e., the states of other moving objects, such as other vehicles, are unchanged). Further, whereas the observed view $I_t$, is centered on the ego-vehicle, the current-action embedded view $I_{at}$ is not necessarily centered on the ego-vehicle (for example, if the estimated future state of the ego-vehicle is at a different position).

The current-action embedded view $I_{at}$ reflects a rules-based prediction of the future state of the ego-vehicle 105 at the next time step, and is an application of the prior knowledge about the ego-vehicle 105 (e.g., known behavior of the ego-vehicle 105 to applied velocity and acceleration). By using a rules-based prediction for estimating the future state of the ego-vehicle 105, a machine learning-based prediction (to be generated by the prediction module 208) may be simplified because only the interaction of other vehicles need to be predicted.

The prediction module 208 receives as input the set of observations $O_{1:t}$ (including the current observation Or and previous observations starting from time step t=1), and the current-action embedded view $I_{at}$ produced by the action embedding module 204. The set of observations $O_{1:t}$ may represent observations collected over a defined moving time window, for example. The prediction module 208 is trained to compute the second order action effects (i.e., the interaction of other moving objects, such as other vehicles, in the environment 100 with the changed state of the ego-vehicle 105). The prediction module 208 outputs a predicted view, denoted as $\hat{I}_{a(t+1)}$, for a next future time step t+1 (where the accent ^ denotes a predicted, or estimated, output; it should be noted that the ground truth for the prediction is denoted as $I_{a(t+1)}$ without the accent ^). In the predicted view $\hat{I}_{a(t+1)}$, the ego-vehicle 105 is at the same estimated future state as in the current-action embedded view $I_{at}$, and other moving objects also are at predicted future states (for the same future time step t+1) in response to the estimated future state of the ego-vehicle 105. Notably, the predicted view $\hat{I}_{a(t+1)}$ is not necessarily centered on the ego-vehicle 105. The predicted view $\hat{I}_{a(t+1)}$ is centered on the same field-of-view (FOV) as the observed view $I_t$, with the result that any unmoving objects (e.g., buildings, lane markers, etc.) appear unchanged between the view $I_t$ and the predicted view $I_{a(t+1)}$. This may help to simplify and/or speed up training of the prediction module 208 because the prediction module 208 only needs to learn prediction of moving objects.

The predicted view $\hat{I}_{a(t+1)}$ is received as input by the re-centering module 206. The re-centering module 206 also receives the estimated change ($\Delta p_{t+1}$, $\Delta v_{t+1}$) in the state of the ego-vehicle 105 from the measurements estimator module 202. The re-centering module 206 uses a rules-based approach to produce a re-centered predicted view $\hat{I}_{t+1}$, in which the ego-vehicle 105 is at the center of the predicted view $\hat{I}_{t+1}$. For example, the re-centering module 206 may shift the predicted view $\hat{I}_{a(t+1)}$ by an amount corresponding to the estimated change in position $\Delta p_{t+1}$ of the ego-vehicle 105, in order to produce the re-centered predicted view $\hat{I}^{t+1}$. In some examples, the predicted view $\hat{I}_{a(t+1)}$ generated by the prediction module 208 may have a larger FOV than the re-centered predicted view $\hat{I}_{t+1}$, so that the re-centering module 206 may perform the re-centering by cropping the predicted view $\hat{I}_{a(t+1)}$ in order to re-center the predicted view on the ego-vehicle 105. In other examples, the re-centering module 206, after re-centering the predicted view $\hat{I}_{a(t+1)}$, may process the re-centered predicted view $\hat{I}_{t+1}$ using an image processing algorithm (e.g., using simple polynomial extrapolation, or more complex techniques such as graph matching) to extrapolate any missing portions of the re-centered predicted view $\hat{I}_{t+1}$. The re-centered predicted view $\hat{I}_{t+1}$ is centered on the ego-vehicle 105 (also referred to as being "egocentric"), to enable the re-centered predicted view $\hat{I}_{t+1}$ to be used for further processing by learned policy models (or for further iterations in training the prediction module 208) that expect egocentric input.

The re-centered predicted view $\hat{I}_{t+1}$ and the estimated future state of the ego-vehicle 105 (estimated by the measurements estimator module 202, and denoted as ($\hat{p}_{t+1}$, $\hat{v}_{t+1}$)) are received by the observation constructor 210. The observation constructor 210 constructs the predicted future observation $\hat{O}_{t+1}$. For example, the observation constructor 210 may concatenate the re-centered predicted view $\hat{I}_{t+1}$ with the estimated future state of the ego-vehicle 105 ($\hat{p}_{t+1}$, $\hat{v}_{t+1}$), to construct the predicted future observation $\hat{O}_{t+1}(\hat{I}_{t+1}, \hat{p}_{t+1}, \hat{v}_{t+1})$.

The predicted future observation $\hat{O}_{t+1}$ may be fed back, to be included into the set of observations (now denoted as $O_{1:t+1}$), in order to perform multi-step prediction using the action-based prediction subsystem 305. The action-based prediction subsystem 305 is trained end-to-end, meaning that gradient-based learning (or other suitable learning technique) is applied to learn the action-based prediction subsystem 305 as a whole, rather than training individual modules separately (as may be done in some existing known solutions).

The predicted future observation $\hat{O}_{t+1}$ may, after the action-based prediction subsystem 305 has been sufficiently trained, be used (e.g., as input to a learned policy model 310 (FIG. 2)) to generate a driving action to be executed by the ego-vehicle 105 or to train the policy model 310 to generate a driving action.

FIGS. 4A-4D illustrate examples of OGMs representing the different types of views that are used in training the predictor of the action-based prediction subsystem 305 described above. These simplified examples show a bird's-eye view of the environment, with the vehicle 105 (i.e., the ego-vehicle) illustrated as a black rectangle, and other moving vehicles 101 illustrated as white rectangles. The vehicle 105 is travelling in two straight lanes of one-way traffic, with lane markers indicated as straight horizontal lines in each image. Although OGMs are described in these examples, it should be understood that the bird's-eye view of the environment may be represented in other formats, such as 2D images.

Figure 4A:
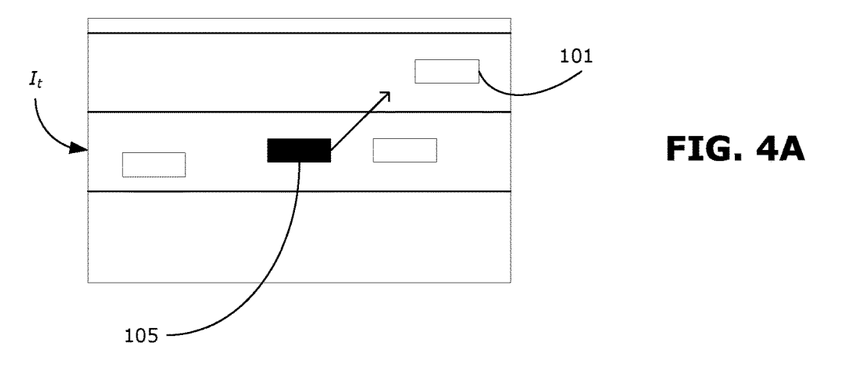
FIGS. 4A-4D illustrate examples of different types of views that may be used in training the action-based prediction subsystem of FIG. 3.

FIG. 4A shows an example of the current observed view $I_t$, which is centered on the vehicle 105. The vehicle 105 has a current state, for example including a current position and current velocity ($p_t$, $v_t$). The current action at of the vehicle 105 is represented in FIG. 4A as an arrow. However, it should be understood that the current action at may be provided separately from the view $I_t$ (i.e., the current action at of the vehicle 105 may not be encoded in the view $I_t$).

Figure 4B:
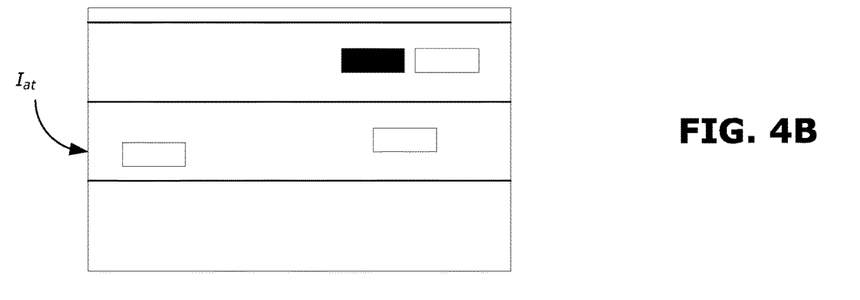

FIG. 4B illustrates the current-action embedded view $I_{at}$, which may be produced by the action embedding module 204 based on the current observed view $I_t$ and the current action at of FIG. 4A. Notably, the current-action embedded view $I_{at}$ shows the estimated future state of the autonomous vehicle 105 (indicated by the changed position of the vehicle 105 compared to FIG. 4A) as a result of the current action $a_t$. However, the positions of the other vehicles 101 in the current-action embedded view $I_{at}$ are unchanged compared to the current observed view $I_t$. In other words, the current-action embedded view $I_{at}$ shows the first order action effects of the current action $a_t$, but not the second order action effects.

Figure 4C:
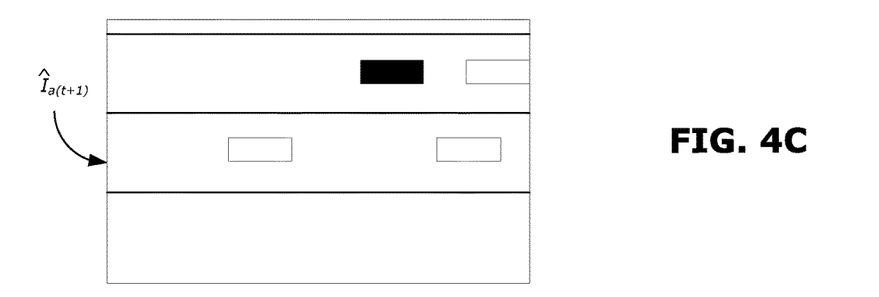

FIG. 4C illustrates the predicted view $\hat{I}_{a(t+1)}$, which may be inferred by the prediction module 208 based on the current-action embedded view $I_{at}$ of FIG. 4B. The predicted view $\hat{I}_{a(t+1)}$ shows the estimated future state of the vehicle 105, which is the same as in the current-action embedded OGM $I_{at}$, and additionally shows the estimated future positions of the other vehicles 101 at time t+1 in reaction to the estimated future state of the vehicle 105. In other words, the current-action embedded view $\hat{I}_{a(t+1)}$ shows the first order action effects of the current action $a_t$, as well as the second order action effects.

Figure 4D:
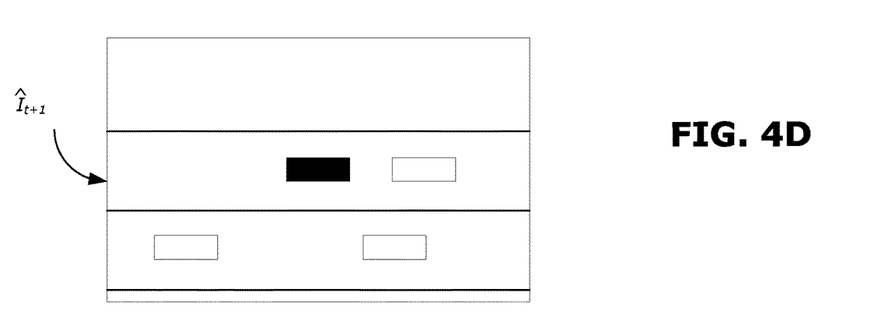

FIG. 4D illustrates the re-centered predicted view $\hat{I}_{t+1}$, which is simply the predicted view $\hat{I}_{a(t+1)}$, but re-centered to place the vehicle 105 at the center (i.e., so that it is egocentric). The re-centered predicted view $\hat{I}_{t+1}$ may be produced by the re-centering module 206, for example by extrapolating from the predicted view $\hat{I}_{a(t+1)}$ and/or cropping the predicted view $\hat{I}_{a(t+1)}$ as appropriate. It should be noted that the relative positions of the vehicle 105 and the other vehicles 101 are unchanged from the predicted view $\hat{I}_{a(t+1)}$, only shifted horizontally and vertically.

An example of the prediction module 208 is now described in detail.

Figure 5:
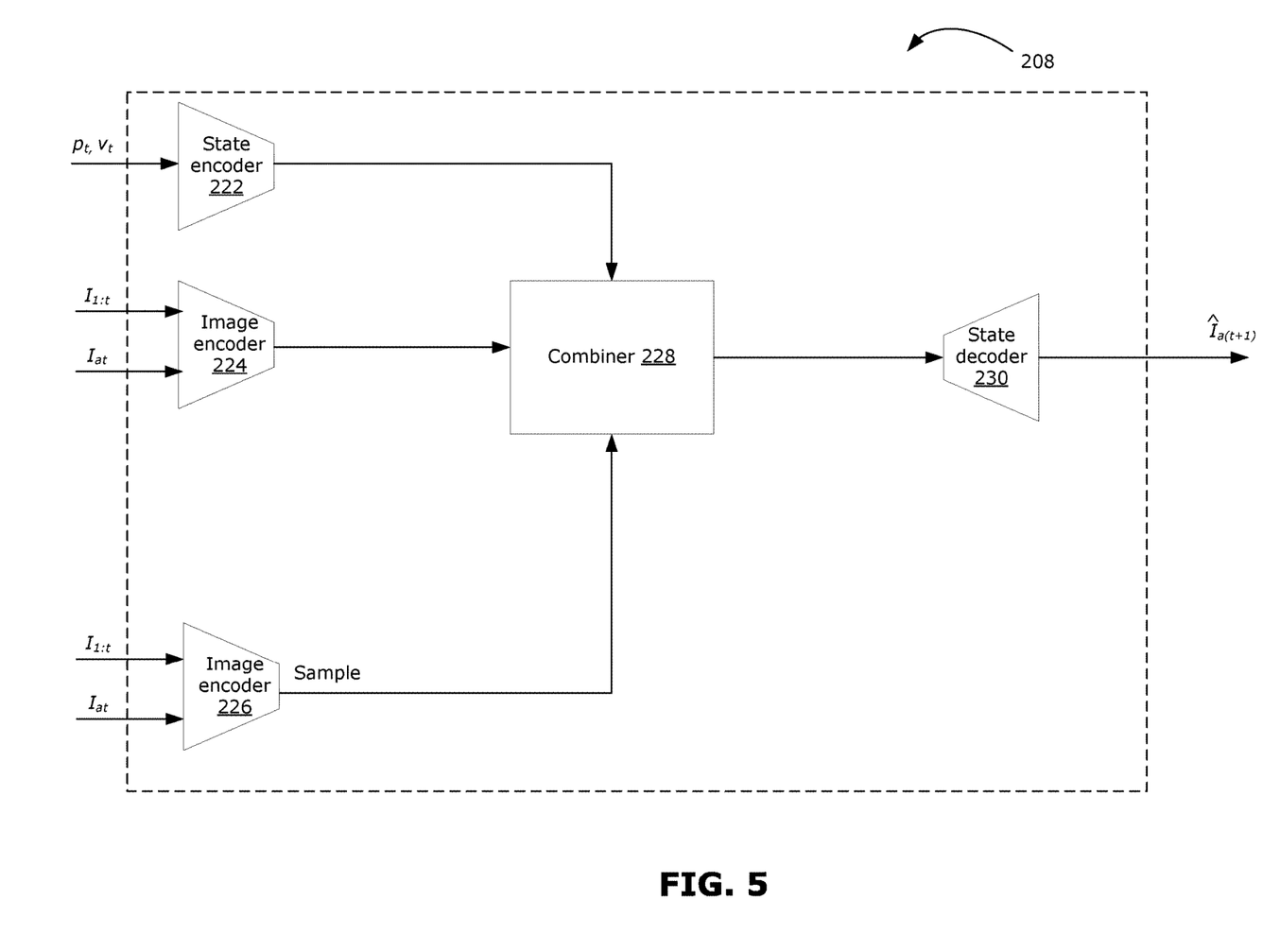
FIG. 5 is a block diagram illustrating an example implementation of a prediction module, which may be part of the action-based prediction subsystem of FIG. 3.

FIG. 5 is a block diagram illustrating an example implementation of the prediction module 208 based on an architecture of conditional variational autoencoders (CVAEs). In other examples, the prediction module 208 may have other encoder-decoder architectures.

The prediction module 208 implements a CVAE that learns a probabilistic latent space (which is the set of all learned representations), from which samples are taken in order to generate predicted views, as discussed below. The CVAE of the prediction module 208 includes a state encoder 222 that receives the current vehicle state (in this example, the current vehicle position and velocity ($p_t$, $v_t$)) and encodes the current vehicle state into a first multidimensional vector (also referred to as a first "code") representing the state of the vehicle 105 (i.e. vehicle state). The CVAE of the prediction module 208 also includes a deterministic image encoder 224 that receives the views (e.g., represented by OGMs) of the environment 100, denoted as $I_{1:t}$ (which includes a current view of the environment 100, as well as one or more historical views of the environment 100), that is included in the set of observations $O_{1:t}$. The deterministic image encoder 224 also receives the current-action embedded view $I_{at}$. The deterministic image encoder 224 encodes the views of the environment $I_{1:t}$ and the current-action embedded view $I_{at}$ into a second multidimensional vector (also referred to as a second code) representing the current-action embedded view $I_{at}$. The state encoder 222 and image encoder 224 are learned encoders (e.g., convolutional neural networks (CNNs)) that are trained to encode their respective inputs into representative vectors that can be combined (i.e., the multidimensional vectors encoded by the state encoder 222 and the image encoder 224 are of the same dimensionality). For example, the state encoder 222 may be a CNN comprising fully-connected layers for processing the current state of the vehicle 105 (i.e. current vehicle state), to generate the first multidimensional vector. The image encoder 224 may be a CNN configured to process the bird's-eye views of the environment $I_{1:t}$, and the current-action embedded view $I_{at}$, to generate the second multidimensional vector.

The CVAE of the prediction module 208 also includes a probabilistic image encoder 226. The probabilistic image encoder 226 also receives the views of the environment $I_{1:t}$ and the current-action embedded view $I_{at}$. The probabilistic image encoder 226 is a CNN that includes convolutional layers and the CNN of the probabilistic image encoder 226 is trained to learn a latent space representing the conditional probability of a future predicted view $I_{t+1}$, given the set of observations $O_{1:t}$ and the current-action embedded view $I_{at}$, i.e., the probability $p(I_{a(t+1)}|O_{1:t}, I_{at})$. Training of the prediction module 208 involves learning the parameters (i.e. weights and biases) of the CVAE. The prediction module 208 is trained to learn the parameters of the CVAE that maximizes the evidence lower bound (ELBO) of the conditional probability $p(I_{a(t+1)}|O_{1:t}, I_{at})$. For example, the ELBO may be formulated as follows:

$$\log p(I_{a(t+1)}|O_{1:t}, I_{at}) \geq \mathbb{E}_{q(z_t|O_{1:t}, I_{at}, I_{a(t+1)})}[\log p(I_{t+1}|z_t)] - KL(q(z_t|O_{1:t}, I_{at}, I_{a(t+1)})\|p(z_t|O_{1:t}, I_{at}))$$

The probabilistic image encoder 226 may output a Gaussian distribution, from which a third multidimensional vector (also referred to as a third code) is sampled. The multidimensional vector sampled from the probabilistic image encoder 226 should have the same dimensionality as the multidimensional vectors encoded by the state encoder 222 and the image encoder 224, to enable the respective multidimensional vectors to be combined.

The respective multidimensional vectors from the state encoder 222, image encoder 224 and sampled from the probabilistic image encoder 226 are combined by a combiner 228. The combiner 228 may perform various suitable operations to combine the multidimensional vectors, for example by adding, concatenating or element-wise multiplying the multidimensional vectors. The combined vector (also referred to as combined code) is received by a state decoder 230, which converts the combined vector into the predicted view $\hat{I}_{a(t+1)}$. For example, the state decoder 230 may be a deconvolutional neural network that includes both deconvolutional layers and fully-connected layers.

Figure 6A:
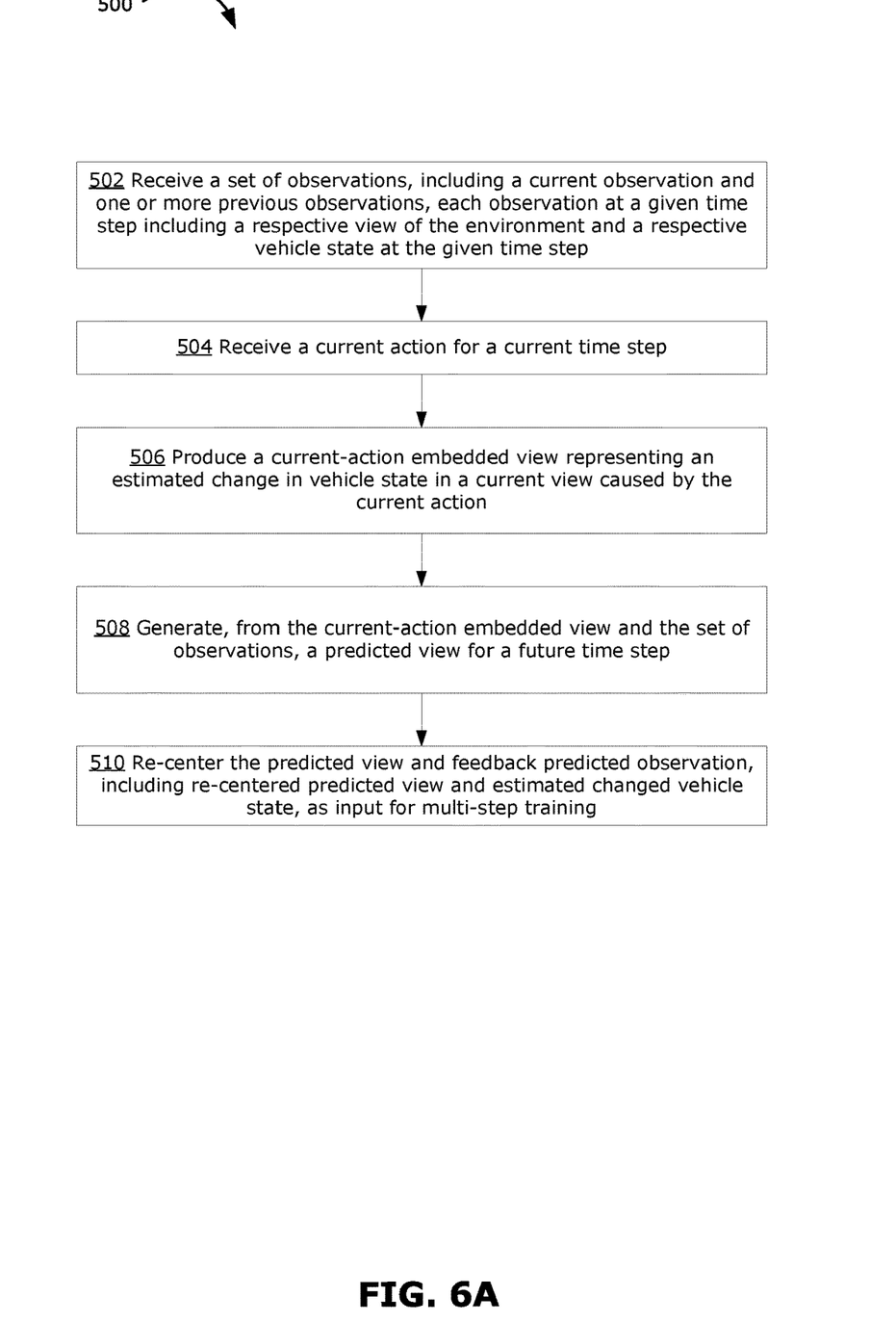
FIG. 6A is a flowchart illustrating an example method for training the action-based prediction subsystem of FIG. 3.

FIG. 6A is a flowchart illustrating an example method 500 for training the action-based prediction subsystem 305. The method 500 may be performed for offline training of the action-based prediction subsystem 305, for example by a computing system external to the vehicle 105 or by the processor system 102 of the vehicle 105 in a non-driving mode, by executing instructions encoding the steps of the method 500. The trained action-based prediction subsystem 305 may be subsequently implemented in the action generator system 300 of the vehicle 105, for generating actions to be executed by the vehicle 105 in real-world driving. The method 500 will be discussed with reference to FIG. 3.

At 502, the set of observations $O_{1:t}$ is received by the action-based prediction subsystem 305. The set of observations $O_{1:t}$ includes a current observation $O_t$ for a current time step t and one or more previous observations. As discussed above, each observation for a given time step includes a respective bird's-eye view of the environment 100 (e.g., represented by an OGM) and a state of the vehicle 105 (e.g., including a position and a velocity of the vehicle 105) for that given time step.

At 504, the current action at to be executed by the vehicle 105 is received for the current time step.

At 506, a current-action embedded view $I_{at}$ is produced by the embedding module 201 (e.g., by the action-embedding module 204, as discussed above). The current-action embedded view $I_{at}$ represents the estimated change in the state of the vehicle 105 (e.g., as estimated by the measurements estimator module 202, as discussed above) caused by the current action at (i.e., the first order action effects) in the current view.

At 508, using the set of observations $O_{1:t}$ and the current-action embedded view $I_{at}$ as input, a predicted view $\hat{I}_{a(t+1)}$ (e.g., represented by an OGM) is generated using a prediction module 208, which includes a CVAE. The predicted view represents a view of the environment 100 for a future time step. The predicted view represents the estimated change in vehicle state and also estimated changes in the environment 100 (i.e., both first order action effects and second order action effects), due to the current action $a_t$.

At 510, the predicted view is re-centered by the re-centering module 206. The re-centering module 206 provides the re-centered predicted view $\hat{I}_{t+1}$ (e.g., represented as an OGM). The re-centered OGM $\hat{I}_{t+1}$ is received by the observation constructor 210. The observation constructor 210 also receives the estimated changed to the state of the vehicle 105 (e.g., estimated future position and velocity) ($\hat{p}_{t+1}$, $\hat{v}_{t+1}$), to construct the predicted future observation $\hat{O}_{t+1}$ (e.g., by concatenating the re-centered predicted OGM $\hat{I}_{t+1}$ with the estimated future state ($\hat{p}_{t+1}$, $\hat{v}_{t+1}$)). The predicted future observation $\hat{O}_{t+1}$ is fed back to the input of the action-based prediction subsystem 305, as input for multi-step training (e.g., the predicted future observation $\hat{O}_{t+1}$ is added to the set of observations for a further training iteration).

Figure 6B:
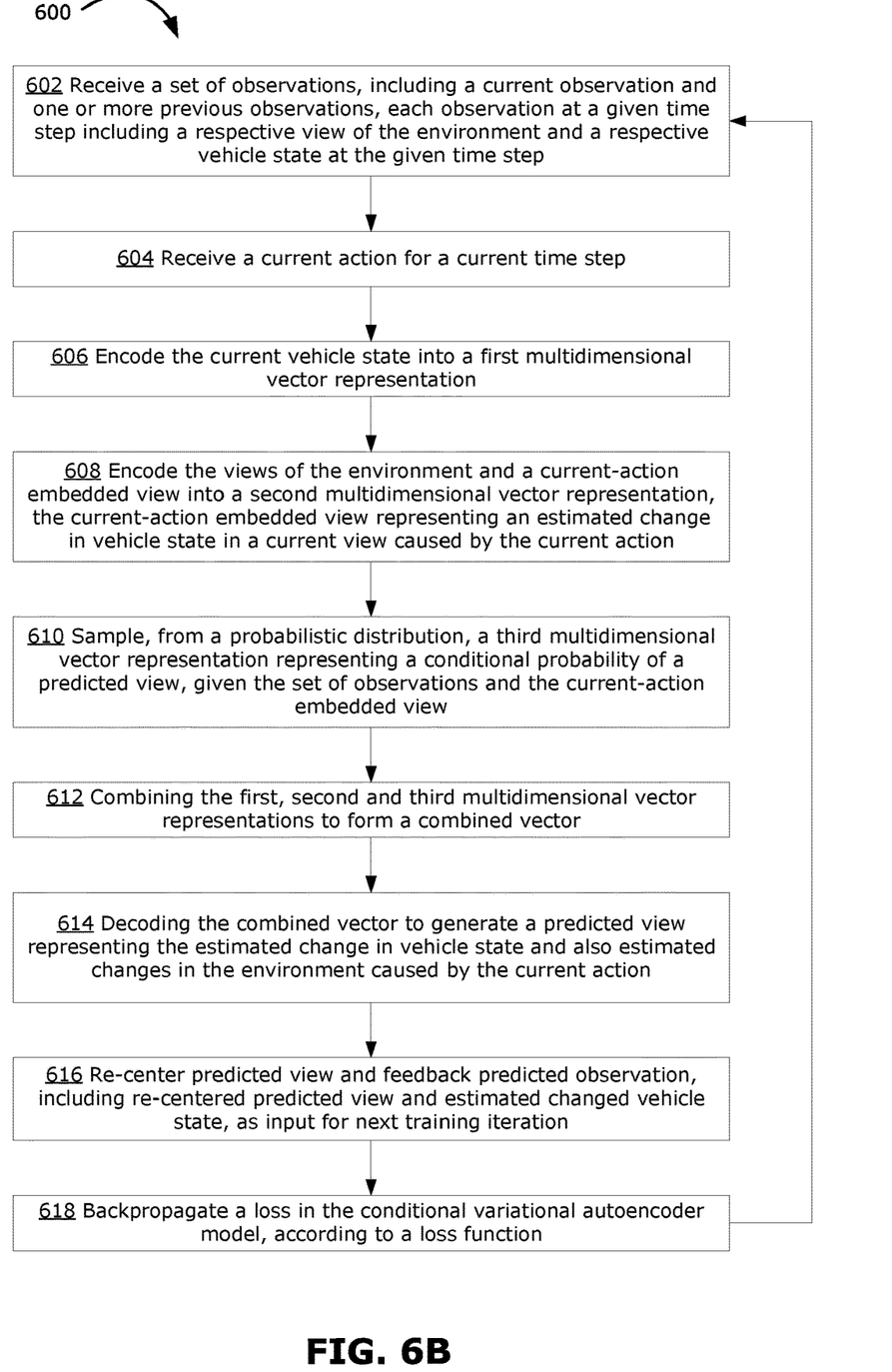
FIG. 6B is a flowchart illustrating example details of the method of FIG. 6A.

FIG. 6B is a flowchart illustrating an example method 600 for training the action-based prediction subsystem 305. The method 600 includes example details for performing the method 500 described above, in particular details relevant to training the prediction module 208. The method 600 may be performed for training of the action-based prediction subsystem 305 offline, for example by a computing system external to the vehicle 105 or by the processor system 102 of the vehicle 105 when the vehicle 105 is not operating in autonomous or semi-autonomous mode, by executing instructions encoding the steps of the method 600. For example, the action-based prediction subsystem 305 may be trained using a simulator system that simulates the behavior of the vehicle 105 and the other vehicles in an environment. The trained action-based prediction subsystem 305 may be subsequently deployed to the vehicle 105 and implemented in the action generator system 300 of the vehicle 105, for generating actions to be executed by the vehicle 105 in real-world driving. The method 600 will be discussed with reference to both FIGS. 3 and 5.

At 602, the set of observations $O_{1:t}$ is received by the prediction module 208. The set of observations $O_{1:t}$ includes a current observation $O_t$ for a current time step t and one or more previous observations. As discussed above, each observation for a given time step includes a respective bird's-eye view of the environment 100 (e.g., represented by an OGM) and a state of the vehicle 105 (e.g., including a position and a velocity of the vehicle 105) for that given time step.

At 604, the current action at to be executed by the vehicle 105 is received for the current time step.

The steps 606-614 may be performed to generate the predicted view using the CVAE implemented in the prediction module 208.

At 606, the current state of the vehicle 105 (i.e. vehicle state) is encoded by the state encoder 222 to provide a latent representation of the vehicle state (i.e. state of the vehicle 105) in a d-dimensional space (e.g., representation as a first multidimensional vector). The state encoder 222 may include a DNN, such as a CNN or a fully connected neural network (FCNN), trained to generated the representation as the first multidimensional vector.

At 608, the views $I_{1:t}$ of the environment 100 (including a current view and one or more historical views) and the current-action embedded view $I_{at}$ (e.g., each view in $I_{1:t}$ and the current-action embedded view $I_{at}$ being represented by a respective OGM) is received by the prediction module 208 and encoded by the deterministic image encoder 224 (e.g., implemented using a CNN) into a latent d-dimensional representation of the views $I_{1:t}$ and $I_{at}$ (e.g., representation as a second multidimensional vector). The current-action embedded view $I_{at}$ is produced by the embedding module 201 (e.g., by the action-embedding module 204, as discussed above), and represents the estimated change in the state of the vehicle 105 (i.e. vehicle state) (e.g., as estimated by the measurements estimator module 202, as discussed above) caused by the current action $a_t$, in the current view.

At 610, a probabilistic distribution estimated by the probabilistic image encoder 226 is sampled to obtain a third multidimensional vector. The views of the environment $I_{1:t}$ and the current-action embedded view $I_{at}$ are received by the probabilistic image encoder 226. The probabilistic image encoder 226 estimates a latent probabilistic distribution representing the conditional probability of a predicted view, given the set of observations and the current-action embedded view (i.e., the probability $p(I_{a(t+1)}|O_{1:t}, I_{at})$). From this probabilistic distribution (e.g., which may have a Gaussian distribution), the third multidimensional vector is sampled. The third multidimensional vector is a latent d-dimensional representation of the conditional probability.

At 612, the respective d-dimensional representations (e.g., the first, second and third multidimensional vectors) from the state encoder 222, image encoder 224 and probabilistic image encoder 226, respectively, are combined by the combiner 228 (e.g., combined by addition) to form a combined vector.

At 614, the combined vector is decoded by the state decoder 230, which may include a DNN, such as a CNN and a FCNN. The state decoder 230 decodes the combined vector to generate the predicted view $\hat{I}_{a(t+1)}$ (e.g., represented as an OGM). The predicted view represents the estimated change in vehicle state (i.e. state of the vehicle 105) and also estimated changes in the environment, due to the current action $a_t$.

At 616, the predicted view $\hat{I}_{a(t+1)}$, from the prediction module 208, is re-centered by the re-centering module 206. The re-centering module 206 provides the re-centered predicted view $\hat{I}_{t+1}$ (e.g., represented as an OGM). The re-centered OGM $\hat{I}_{t+1}$ is received by the observation constructor 210. The observation constructor 210 also receives the estimated changed state of the vehicle 105 (e.g., estimated future position and velocity) ($\hat{p}_{t+1}$, $\hat{v}_{t+1}$), to construct the predicted future observation $\hat{O}_{t+1}$ (e.g., by concatenating the re-centered predicted OGM $\hat{I}_{t+1}$ with the estimated future state ($\hat{p}_{t+1}$, $\hat{v}_{t+1}$)). The predicted future observation $\hat{O}_{t+1}$ is fed back to the input of the action-based prediction subsystem 305, to be added to the set of observations as input for the next training iteration.

At 618, the Kullback-Leibler (KL) loss of the CVAE of the prediction module 208 is computed and backpropagated, to update the parameters (i.e. weights and biases) of neural networks of the action-based prediction subsystem 305 in an end-to-end manner. The KL loss to be computed at each time step of this training method may be according to the following loss function:

$$\mathcal{L} = \|f(O_{1:t}, a_t, z_t) - I_{a(t+1)}\|^2 KL(q(z_t|O_{1:t}, I_{at}, I_{a(t+1)}) \| p(z_t|O_{1:t}, I_{at}))$$

The method 600 may return to step 602 for a next training iteration.

After the action-based prediction subsystem 305 is sufficiently trained (e.g., after performing a defined number of training iterations, or after the loss function sufficiently converges), predicted future observations $\hat{O}_{t+1}$ can be used for training the policy model 310.

In particular, during training of the action-based prediction subsystem 305, the current action $a_t$ that is provided as input can include a wider range of actions, including rare or extreme actions (e.g., very sharp turns, very high acceleration, very hard braking, etc.) that are difficult or impossible to collect in large quantities using real-world data. The use of a rules-based approach to estimate the first order action effects of an action enables an extreme action to be artificially introduced in the training data for training the policy model 310, without having to collect real-world data about the first order action effects of such extreme action. Thus, compared to some conventional approaches, the disclosed action-based prediction subsystem 305 is able to learn how to predict observations over a wider range of possible actions by the ego-vehicle 105.

Figure 7:
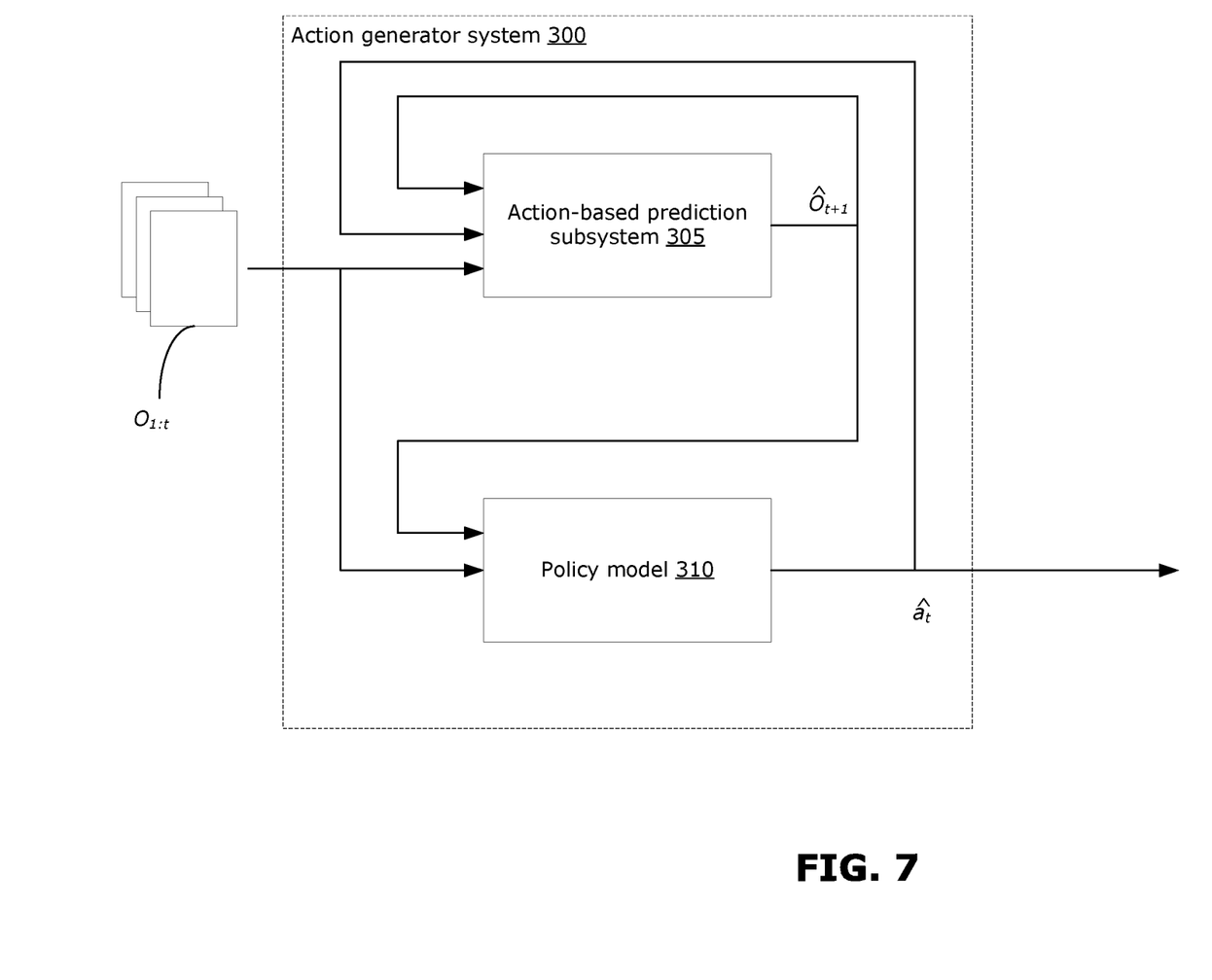
FIG. 7 is a block diagram illustrating an example action generator system, including the action-based prediction subsystem of FIG. 3

FIG. 7 is a block diagram illustrating an example implementation of the action generator system 300. The action generator system 300 includes the trained action-based prediction subsystem 305 and the policy model 310. The action-based prediction subsystem 305 may have been trained using the training method described above. It should be understood that the architecture of the action generator system 300 shown in FIG. 6 is only for the purpose of illustration and is not intended to be limiting. The action-based prediction subsystem 305 may be used in other machine learning models for generating an action to be executed by the vehicle 105.

In the example shown, the reinforcement-learning (RL) based policy model 310 is a neural network that receives the set of observations $O_{1:t}$ and generates an action, denoted $\hat{a}_t$, to be executed by the vehicle 105 (e.g., using the drive control system 150 and the electromechanical system 190). The action $\hat{a}_t$ generated by the policy model 310 is denoted with the accent ^ to distinguish from the current action $a_t$ that is used for training the action-based prediction subsystem 305. The RL-based policy model 310 maps states to actions that minimize an uncertainty of the learned action-based prediction subsystem 305 with regards to the output of the learned action-based prediction subsystem 305. The uncertainty of the learned action-prediction subsystem 305 is computed by applying different Gaussian dropout masks to the learned weights of the neural networks of the trained action-prediction subsystem 305 and computing the variance of the output of trained action-prediction subsystem 305 (i.e., the next future observation $\hat{O}_{t+1}$ predicted by the learned action-prediction system 300). The lower the variance, the more certain the RL-based policy model 310 is about its output (i.e., the generated new action $\hat{a}_t$). The performance of the RL-based policy model 310 (e.g., whether the RL-based policy model 310 generates an action that leads to smooth and safe driving) depends on the quality (e.g., accuracy and confidence) of the predicted future observation $\hat{O}_{t+1}$. Accordingly, training the RL-based policy model 310 in this manner results in the action generator system 300 producing safer and more reliable actions to be executed by the vehicle 105.

In various examples, the present disclosure describes methods and systems that enable multi-step action-conditional observation prediction. At each time step, the effects of actions on the ego-vehicle 105 are estimated using rule-based techniques and embedded in the current observation. This approach enables a prediction model to be learned that is able to account for a wider range of actions compared to conventional prediction models. Further, the disclosed approach helps to reduce the sensitivity of the learned prediction model to the distribution of the actions in the real-world data.

Compared to some conventional approaches to training a prediction model, instead of directly feeding the actions to the prediction model, the actions are embedded in views (e.g., represented as OGMs) and training of the prediction module is performed using these action embedded views.

The disclosed approach enables the prediction model to be trained on a wider range of actions, because the first order action effects are estimated using rule-based techniques (e.g., based on known dynamics of the vehicle) rather than being sampled from real-world data. Thus, the trained prediction model as disclosed may generate more accurate predicted observations in response to rare or extreme actions, compared to conventionally trained prediction models.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of training an action-based prediction subsystem for an autonomous vehicle, the method comprising:
  receiving a set of observations, the set of observations including a current observation for a current time step and one or more previous observations, each observation for a given time step comprising a respective view of an environment of the autonomous vehicle and a vehicle state at the given time step;
  receiving a current action performed by the autonomous vehicle at the current time step;

producing a current-action embedded view, the current-action embedded view representing an estimated future state of the autonomous vehicle at a future time step caused by the current action in a current view and also representing the environment of the autonomous vehicle unchanged from the current observation at the current time step;

generating from the current-action embedded view and the set of observations, a predicted view for the future time step, the predicted view representing the estimated future state of the autonomous vehicle at the future time step and also representing an estimated future state of the environment at the future time step;

re-centering the predicted view; and feeding back a predicted observation, including the re-centered predicted view and estimated future state of the autonomous vehicle, to be included in the set of observations as input for multi-step training the action-based prediction subsystem.

2. The method of claim 1, wherein generating the predicted view comprises:
encoding a current vehicle state into a first multidimensional vector;
encoding the views of the environment and the current-action embedded view into a second multidimensional vector;
sampling a probabilistic distribution estimated by a probabilistic image encoder to obtain a third multidimensional vector, the probabilistic distribution representing a conditional probability of a predicted view, given the set of observations and the current-action embedded view; and
decoding a combined vector, the combined vector being produced by combining the first, second and third multidimensional vectors, to generate the predicted view.

3. The method of claim 1, further comprising:
computing a loss according to a loss function; and
backpropagating the loss to update parameters of the action-based prediction subsystem.

4. The method of claim 1, wherein the vehicle state at each given time step includes a vehicle position and a vehicle velocity.

5. The method of claim 1, wherein the estimated future state of the autonomous vehicle is based on an estimated change in vehicle state caused by the current action that is computed using defined rules based on known dynamics of the autonomous vehicle.

6. The method of claim 1, wherein the trained action-based prediction subsystem is used to generate predicted observations for an action generator system.

7. A computing system comprising a processor system coupled to a memory, the memory storing instructions that, when executed by the processor system, cause the computing system to:
receive a set of observations, the set of observations including a current observation for a current time step and one or more previous observations, each observation for a given time step comprising a respective view of an environment of the autonomous vehicle and a vehicle state at the given time step;
receive a current action performed by the autonomous vehicle at the current time step;
produce a current-action embedded view, the current-action embedded view representing an estimated future state of the autonomous vehicle at a future time step caused by the current action in a current view and also representing the environment of the autonomous vehicle unchanged from the current observation at the current time step;

generate from the current-action embedded view and the set of observations, a predicted view for the future time step, the predicted view representing the estimated future state of the autonomous vehicle at the future time step and also representing an estimated future state of the environment at the future time step;

re-center the predicted view; and feed back a predicted observation, including the re-centered predicted view and estimated future state of the autonomous vehicle, to be included in the set of observations as input for multi-step training an action-based prediction subsystem.

8. The computing system of claim 7, wherein the instructions cause the computing system to generate the predicted view by:
encoding a current vehicle state into a first multidimensional vector;
encoding the views of the environment and the current-action embedded view into a second multidimensional vector;
sampling a probabilistic distribution estimated by a probabilistic image encoder to obtain a third multidimensional vector, the probabilistic distribution representing a conditional probability of a predicted view, given the set of observations and the current-action embedded view; and
decoding a combined vector, the combined vector being produced by combining the first, second and third multidimensional vectors, to generate the predicted view.

9. The computing system of claim 7, wherein the instructions further cause the computing system to:
compute a loss according to a loss function; and
backpropagate the loss to update parameters of the action-based prediction subsystem.

10. The computing system of claim 7, wherein the vehicle state at each given time step includes a vehicle position and a vehicle velocity.

11. The computing system of claim 7, wherein the estimated future state of the autonomous vehicle is based on an estimated change in vehicle state caused by the current action that is computed using defined rules based on known dynamics of the autonomous vehicle.

12. The computing system of claim 7, wherein the trained action-based prediction subsystem is used to generate predicted observations for an action generator system.

13. A computer-readable medium having instructions encoded thereon, wherein the instructions, when executed by a processor system of a computing system, cause the computing system to:
receive a set of observations, the set of observations including a current observation for a current time step and one or more previous observations, each observation for a given time step comprising a respective view of an environment of the autonomous vehicle and a vehicle state at the given time step;
receive a current action performed by the autonomous vehicle at the current time step;
produce a current-action embedded view, the current-action embedded view representing an estimated future state of the autonomous vehicle at a future time step caused by the current action in a current view and also representing the environment of the autonomous vehicle unchanged from the current observation at the current time step;

generate from the current-action embedded view and the set of observations, a predicted view for the future time step, the predicted view representing the estimated future state of the autonomous vehicle at the future time step and also representing an estimated future state of the environment at the future time step;

re-center the predicted view; and feed back a predicted observation, including the re-centered predicted view and estimated future state of the autonomous vehicle, to be included in the set of observations as input for multi-step training an action-based prediction subsystem.

14. The computer-readable medium of claim 13, wherein the instructions cause the computing system to generate the predicted view by:

encoding a current vehicle state into a first multidimensional vector;

encoding the views of the environment and the current-action embedded view into a second multidimensional vector;

sampling a probabilistic distribution estimated by a probabilistic image encoder to obtain a third multidimensional vector, the probabilistic distribution representing a conditional probability of a predicted view, given the set of observations and the current-action embedded view; and decoding a combined vector, the combined vector being produced by combining the first, second and third multidimensional vectors, to generate the predicted view.

15. The computer-readable medium of claim 13, wherein instructions further cause the computing system to:

compute a loss according to a loss function; and backpropagate the loss to update parameters of the action-based prediction subsystem.

16. The computer-readable medium of claim 13, wherein the vehicle state at each given time step includes a vehicle position and a vehicle velocity.

17. The computer-readable medium of claim 13, wherein the estimated future state of the autonomous vehicle is based on an estimated change in vehicle state caused by the current action that is computed using defined rules based on known dynamics of the autonomous vehicle.

18. The computer-readable medium of claim 13, wherein the trained action-based prediction subsystem is used to generate predicted observations for an action generator system.

* * * * *